United States Patent
Okada

[19]

[11] Patent Number: 5,806,914
[45] Date of Patent: Sep. 15, 1998

[54] WEATHER STRIP OF MOTOR VEHICLE

[75] Inventor: Masayasu Okada, Nagoya, Japan

[73] Assignee: Toyoda Gosei Co., Ltd, Aichi-ken, Japan

[21] Appl. No.: 831,751

[22] Filed: Apr. 1, 1997

Related U.S. Application Data

[63] Continuation of Ser. No. 427,600, Apr. 24, 1995, abandoned.

[30] Foreign Application Priority Data

| Apr. 29, 1994 | [JP] | Japan | 6-113528 |
| Sep. 6, 1994 | [JP] | Japan | 6-212935 |

[51] Int. Cl.⁶ ........................................ B60J 5/04
[52] U.S. Cl. ............ 296/146.9; 49/495.1; 49/498.1
[58] Field of Search ............ 296/146.2, 146.3, 296/146.9, 206; 49/475.1, 480.1, 484.1, 495.1, 498.1

[56] References Cited

U.S. PATENT DOCUMENTS

| 5,356,194 | 10/1994 | Takeuchi | 296/146.9 |
| 5,375,376 | 12/1994 | Scott | 49/475.1 X |

FOREIGN PATENT DOCUMENTS

| 794152 | 2/1936 | France | 49/495.1 |
| 3322510 | 1/1985 | Germany | 296/146.9 |
| 0064049 | 4/1985 | Japan | 296/146.9 |
| 60-189419 | 12/1985 | Japan . | |
| 3522 | 1/1991 | Japan . | |
| 3178831 | 8/1991 | Japan . | |
| 6135236 | 5/1994 | Japan | 296/146.9 |

*Primary Examiner*—Dennis H. Pedder
*Attorney, Agent, or Firm*—Cushman Darby & Cushman IP Group of Pillsbury Madison & Sutro LLP

[57] ABSTRACT

A door weather strip comprises a mounting base, a sealing section consisting of a first sealing wall, a second sealing wall, and a lip, a vehicle outer side, and a vehicle inner side wall, and has a hollow portion being surrounded and defined by the sealing section, the vehicle outer side wall and the vehicle inner side wall. Then, the bridging section connecting the second sealing wall and the lip is formed near the hollow portion with a recess which forms a thin wall portion as a bending portion for the lip to easily turn back. Accordingly, when the door glass is fully closed, the distal end of the lip turns back to strongly press the inner side surface of the door glass so that high tightness performance can be obtained and the door glass is firmly supported.

7 Claims, 6 Drawing Sheets

WEATHER STRIP OF MOTOR VEHICLE

This is a continuation of application Ser. No. 08/427,600, filed on Apr. 24, 1995, which was abandoned upon the filing hereof.

FIELD OF THE INVENTION

The present invention relates to a weather strip for use on a motor vehicle mounted along the side openings of a motor vehicle, and, more particularly, to an automobile weather strip suitably placed on a motor vehicle having sashless doors.

BACKGROUND OF THE INVENTION

Various automobile weather strips mounted along side openings of a motor vehicle have, conventionally, been designed to enhance the tightness of the seal between the door glass and a door opening so as to improve sound insulation and waterproof.

Such weather strip typically comprises a sealing section, to be brought into close contact with door glass, a mounting base for mounting the weather strip on the body of the motor vehicle, a bridging section, connecting the sealing section and the mounting base, and a hollow portion formed by the sealing section, the mounting base, and the bridging section. When the door glass or the door is closed, the region around the periphery of the door glass presses the sealing section, which deforms the hollow portion. This deformation of the hollow portion brings the end or edge of the door glass into close contact with the sealing section so that the inside of the car is insulated from the outside, and tightness is assured.

Several conventional examples of such automobile weather strip are described below.

For example, JP-A-60-189419 describes a weather strip which has a lip on an end of a hollow portion on the side to which the door glass opens. With such a weather strip construction, as the door glass is being completely closed, the circumferential edge of the door glass presses the sealing section to bend and deform the hollow portion. Thus, the circumferential edge of the door glass is brought into close contact with the sealing section so that tightness is assured at the circumferential edge. As the hollow portion is being deformed, the proximal end portion of the lip is moved in the direction to which the door glass advances, and is closed to the inner side surface of the door glass. Then, the lip contacts the inner side surface to assure tightness. Accordingly, this example has an advantage over other conventional weather strips which only provide tightness with the circumferential edge of the door glass since this example provides excellent tightness also on the inside surface of the door glass.

Another example of a weather strip is shown in FIG. 9 at 50 which has a hollow portion 51 and an independent lip 52. With the weather strip 50 having such lip 52, as shown in FIG. 10, even when the door glass DG is completely closed and its circumferential edge DG1 bends and deforms the hollow portion 51, the position of the proximal end portion of lip 52a is not significantly moved. Therefore, it is possible to avoid a situation where close contact between the distal end of the lip 52 and the door glass DG is degraded because the proximal end portion 52a moves together with the hollow portion 51.

A third example concerns a weatherstrip for a motor vehicle having a sashless door structure does not include a sash for guiding and supporting the door glass as it moves upwardly and downwardly. Without such a guide the door glass tends to tremble due to vibration or to twist due to movements of the vehicle body caused during movement of the vehicle. Thus, a weather strip used for a motor vehicle having a sashless door structure also needs to provide support for the door glass in addition to assuring tightness of the closure of the glass against the vehicle.

As a technique to attain such requirement, JP-A-3-178831 discloses a weather strip 60 as shown in FIG. 11 which comprises a hollow portion 61, an independent lip 62, and a column section 63 for supporting the free end portion 62a of the lip 62. Even when using a weather strip 60 when the door glass DG is completely closed and the lip 62 is pressed by the inner side surface DG2 of the door glass, the lip 62 is pressed back toward the inside surface DG2 by the column section 63, and firmly pressed against the inner side surface DG2.

The shape of such lips and their location are generally determined for a predetermined abutting position against the door glass. Therefore, the lip most effectively supports the door glass when the door glass abuts the predetermined abutting position. In actual assembly, however, there unavoidably arises variation in the accuracy of assembly between vehicles and from one door glass to another. Thus, the position where the door glass actually abuts may differ from the abutting position originally intended in the design.

As a result, in typical weather strips, situations may arise where the lip cannot firmly press the inside surface of the door glass so that the sealing force for the door glass is reduced and high tightness performance cannot be obtained. In addition, the door glass may tremble during use of the vehicle.

Furthermore, in the first example above, since the lip is formed to continue to the sealing section constituting the hollow portion, it tends to be affected as the hollow portion is deformed as the door glass is closed. That is, the distal end of the lip abuts against the inner side surface of the door glass while the proximal end portion of the lip is being moved to the direction to which the door glass advances. Therefore, there arises a problem such that tightness on the inner side surface of the door glass is varied as the hollow portion changes its shape during window closure so that stable tightness performance cannot be expected.

With reference to FIG. 9, 10 since lip 52 is formed independently from the hollow portion 51, the tightness performance is not significantly varied as the hollow portion 51 changes its shape. In this example, however, the proximal end portion 52a of the lip is separated from the inside surface DG2 of the door glass. Thus, in order for the distal end of the lip 52 to surely abut against the inside surface DG2, lip 52 needs to have a relatively long length. When the lip 52 is made longer, however, the restoring force of lip 52 under elastic deformation will be reduced so that high tightness performance may not be expected.

In the FIG. 11 example, since the free end portion 62a of lip 62 is supported by the column section 63, its supporting force complements the resiliency of lip 62. Thus, lip 62 will exhibit a strong repulsion effect so that it can achieve sufficient tightness and supporting performance. However, such an increased repulsion by lip 62 causes the door glass DG to be affected by such repulsion forces when the door is closed. Thus, there arises a problem such that a stronger force is required to close the door. This leads to repeated door closings so that the handling conveniency of the door may be impaired.

SUMMARY OF THE INVENTION

The present invention is designed to overcome such problems, and is intended to provide an automobile weather strip which can enhance closure tightness against the door glass, provide support, and prevent the door from being difficult to close.

To attain the above objectives, according to a first feature of the invention, an automobile weather strip can include a mounting base mounted on a vehicle, a sealing section including a first sealing wall brought into close contact with the circumferential edge of door glass. The sealing section also includes a second sealing wall, continuing from the first sealing wall, positioned next to the inside surface of the door glass. A lip is provided to press against the inside surface of the door glass. The vehicle includes an outer side wall, on which part of the mounting base and the sealing section are connected on the outside of the vehicle, and an inside wall on which another part of the mounting base and the sealing section are located on the inside of the vehicle. The weather strip also includes a hollow portion surrounded and defined by at least the sealing section, the vehicle outer side and inside walls.

The lip is provided with a bridging section formed to project from an end of the second sealing wall toward the first sealing wall. The lip is connected to an end of the second sealing wall, at its middle portion, with the bridging section being further formed with a bending portion. When the circumferential edge of the door glass is brought into close contact with the first sealing wall, the lip construction allows the distal end of the lip to be easily turned back toward the inside surface of the door glass.

According to a second feature of the invention, the bending portion is formed with a lower rigidity than the other portions of the sealing section.

According to a third feature of the invention, the bending portion is formed with a wall thickness that is thinner than the other portions of the sealing section.

The bending portion can also be formed by providing a recess in at least one part thereof.

Further, a reinforcement can be provided in the hollow portion, with the reinforcement connecting an approximately middle portion between the first sealing wall and the second sealing wall and the vehicle inner side wall or the mounting base, being formed in a length longer than the distance connecting both the portions, and having flexibility.

The automobile weather strip with the above-mentioned construction will deform about the door glass as the door closing operation proceeds.

When closing the door, the door glass will first abut against the lip having a bridging section which projects from an end of the second sealing wall toward the first sealing wall, and is connected to an end of the second sealing wall at its middle portion. As the door glass closes further, the distal end of the lip is caused to abut against the door glass, and the circumferential edge of the door glass comes into contact with the first sealing wall. This contact causes the end of the door glass to move while bending the first sealing wall to deform the hollow portion. In other words, the circumferential edge of the door glass becomes surrounded by the hollow portion. Thus, when the first sealing wall is bent and the hollow portion surrounds the circumferential edge of the door glass, a tight seal is assured about the circumferential edge of the door glass, and the inside of vehicle is insulated from the outside.

Additionally, the second sealing wall, which is connected to the first sealing wall, is pulled up in the moving direction of the door glass as the first sealing wall is bent. At the moment, the bending portion is formed at the bridging section, and the distal end of the lip can be easily turned back toward the inner side surface of the door glass around the bending portion as a fulcrum. Then, when the lip starts to turn back, the distal end of the lip is strongly pressed by the inner side surface of the door glass. Therefore, high tightness performance can be assured between the lip and the inner side surface of the door glass, and the door glass can be prevented from being trembled.

Moreover, according to the invention, when the door is closed, the lip can be easily flexed around the bending portion as a fulcrum under the pressing force from the door, but there is no column of the like preventing such flexing. Accordingly, it is possible to avoid such a situation that the door cannot be completely closed because of high repulsion from the lip.

Furthermore, according to the fifth feature of the invention, in addition to the above, the hollow portion is provided therein with the reinforcement connecting a substantially middle portion between the first sealing wall and the second sealing wall and the vehicle inner side wall or the mounting base. Thus, even if the first and second sealing walls are repeatedly deformed under stress, they are supported and reinforced by the reinforcement. Accordingly, the first and second sealing walls hardly fatigue so that their shapes can be maintained for a long period of time.

Additionally, the reinforcement is formed in a length longer than the distance connecting both portions, and has flexibility. Thus, it can easily flexed when the door is closed. Accordingly, even if the reinforcement is provided, it is possible to avoid such a situation that the repulsion becomes too high to prevent the door from being closed.

DESCRIPTION OF THE PREFERRED EMBODIMENTS

Now, several embodiments of the invention embodied in an automobile weather strip will be explained with reference to the attached drawings.

Embodiment 1

The construction of a door weather strip DW1 according to the first embodiment is described with reference to FIGS. 1–3. In the first embodiment, the door weather strip, generally indicated at DW1, is mounted on a roof side section 2.

Figure 1:
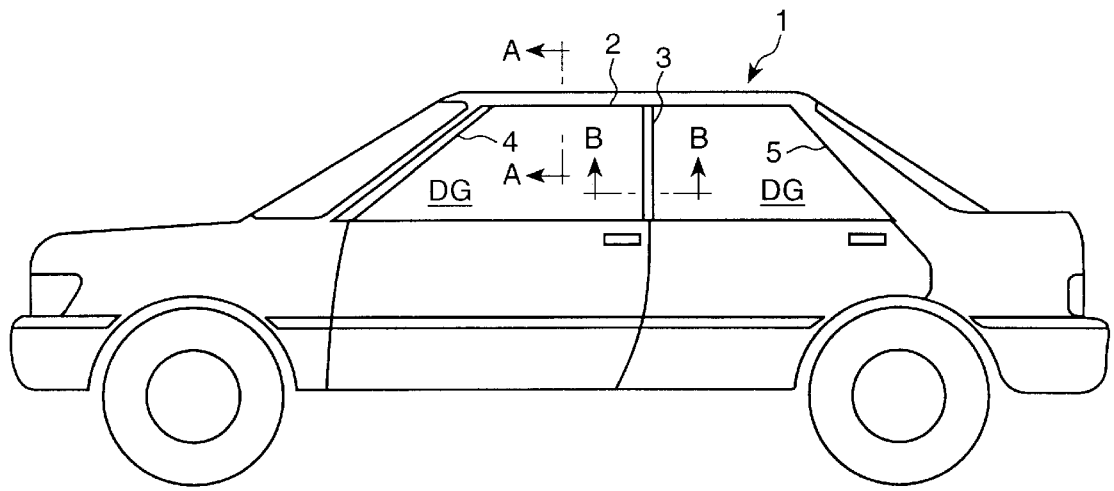
FIG. 1 is a side view of a motor vehicle for illustrating the mounting position of a door weather strip according to the first and second embodiments.

FIG. 1 shows a motor vehicle 1 having a sashless door. The door weather strip DW1 is mounted on the roof side section 2, a center pillar 3, a front pillar 4, and a rear pillar 5 opposite the circumferential end of door glass DG.

Figure 2:
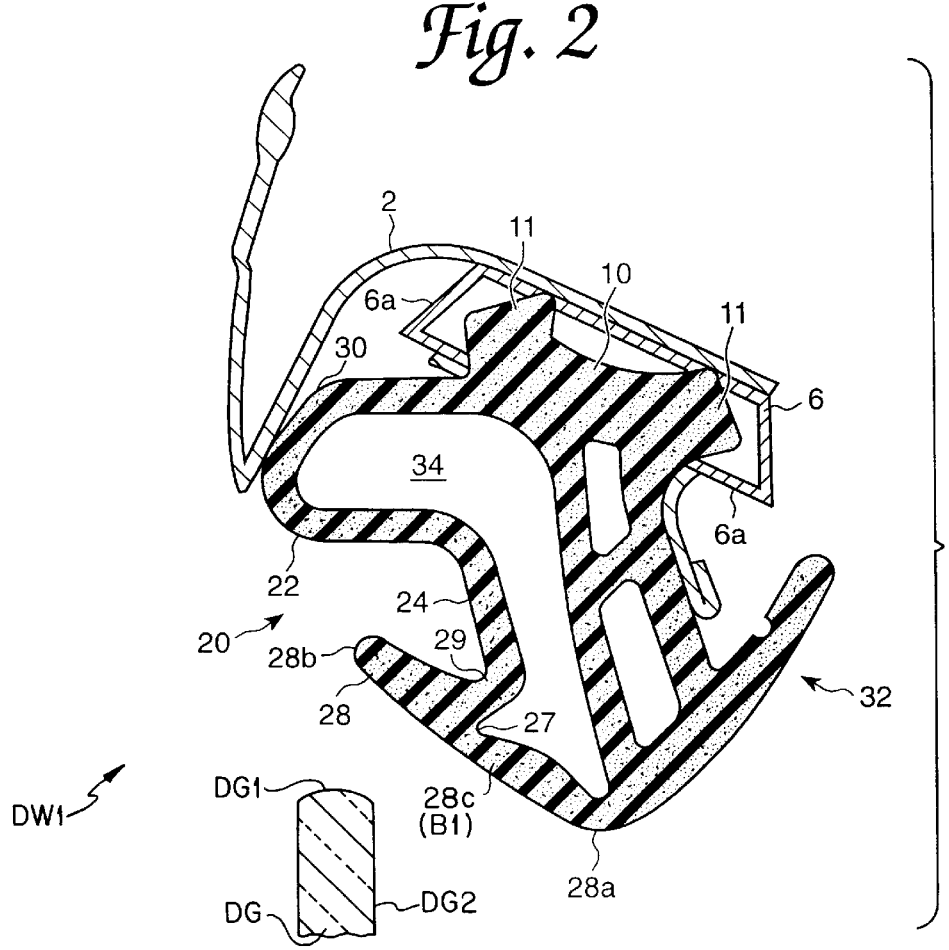
FIG. 2 is a cross sectional view of the door weather strip according to a first embodiment taken along line A—A in FIG. 1 with the door glass opened.

As shown in FIG. 2, the roof side section 2, for example, is provided with a retainer 6 having a hook-shaped flange 6a at each end. The door weather strip DW1 is preferably formed by, and shown in FIG. 2 as, EPDM (ethylene-propylene-diene copolymer) preferably in foam form, and comprises a sealing section 20 including a mounting base 10, a first sealing wall 22, a second sealing wall 24, and a lip 28, an outer side wall 30, and an inner side wall 32.

The mounting base 10 is formed with a pair of laterally projecting mounting sections 11 each of which engages a respective flange 6a of the retainer 6. This mounting arrangement causes the door weather strip DW1, including the mounting base 10, to be surrounded and held by retainer 6.

An outer side wall 30 connects together that portion of the mounting base 10 which seals the door glass and the first sealing wall 22 on the outside of the vehicle. The outer side wall 30 extends from the outer portion of the mounting base 10 to a point outside the vehicle to reach the roof side section 2 where it directly abuts against the roof side section 2 and is bent toward the opening side of the door glass DG, that is in a downward direction in FIGS. 2 and 3.

The inner side wall 32 of weather strip DW1 connects together the inner side of the mounting base 10 inside the vehicle and the proximal end portion 28a of the lip 28. Then, a hollow portion 34 is surrounded and defined by the sealing section 20, the weather strip outer side wall 30 and inner side wall 32.

The first sealing wall 22 of sealing section 20 is connected at one end (the left end in FIG. 2) to the lower end of the outer side wall 30, and extended toward the inside of the vehicle from such connected portion to be generally perpendicular to the door glass DG.

The second sealing wall 24 is connected at one end at its upper portion to the other end (the right end in FIG. 2) of the first sealing wall 22. Second sealing wall 24 then extends downwardly from that connection to be generally parallel to the inside surface DG2 of the door glass when the door glass DG is fully closed. The lower end of the second sealing wall 24 is connected to the substantially middle portion of lip 28 to form a bridging section 29 at that connection.

Lip 28 is connected at its proximal end portion 28a to the lower end of the weather strip inner side wall 32. The distal end or tip portion 28b is projected upward with inclination or toward the first sealing wall 22.

Referring to FIG. 2, a recess 27 is formed in the middle portion of the lip 28 at the inner side thereof facing the hollow space 34 and close to the end of the bridging section 29 attached to the lip 28 so that the lip 28 has a thin walled section 28c thinner than the wall thickness at other portions of the sealing section 20. That is, as the rigidity of the thin walled section 28c at that section is made lower than other portions, the thin walled section 28c forms the bending portion B1. The thin wall section 28c may be formed so as to be a relatively large width toward the proximal end portion 28a of the lip but relatively shallow, or formed in a relatively deep groove shape.

Figure 11:
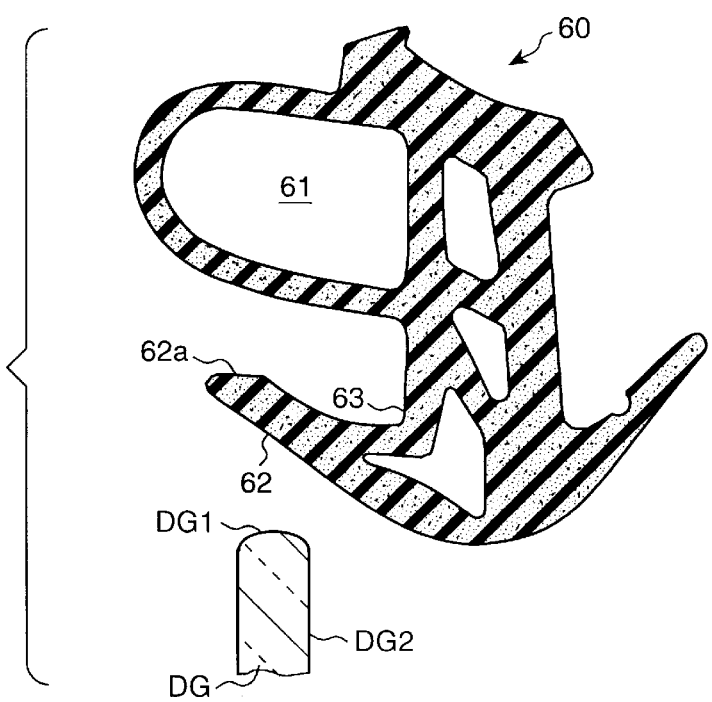
FIG. 11 is a cross sectional view of the door weather strip according to the third conventional example with the door glass opened.

As the door weather strip DW1 is constructed as described above, the hollow portion 34 has a substantially inverted L-shape cross section formed by a laterally extending space formed by the mounting base 10, the weather strip outer side wall 30 and the first sealing wall 22, and a longitudinally extending space formed by the second sealing wall 24, the lip 28, the weather strip inner side wall 32 and the mounting base 10. In this embodiment, such a laterally extending space communicates with the longitudinally extending space so that there is no column portion as provided in the third conventional example of FIG. 11 described above. Here, the lateral direction means the horizontal direction on the surface of the sheet of the drawing, while the longitudinal direction means a vertical direction relative to the surface of the sheet of the drawing.

The operation and advantages of the door weather strip DW1 with the above construction according to the first embodiment are as follows.

First, the door weather strip DW1 is mounted on the roof side section 2 by bending the mounting base 10, and inserting the mounting sections 11 into the retainer 6. As the mounting sections 11 restore their original shape they engage flanges 6a, respectively.

When the door weather strip DW1 is mounted as described, the first sealing wall 22 is disposed at a position opposite to the end of door glass DG1, while the second sealing wall 24 is disposed along the inner side surface DG2 of the door glass.

Figure 3:
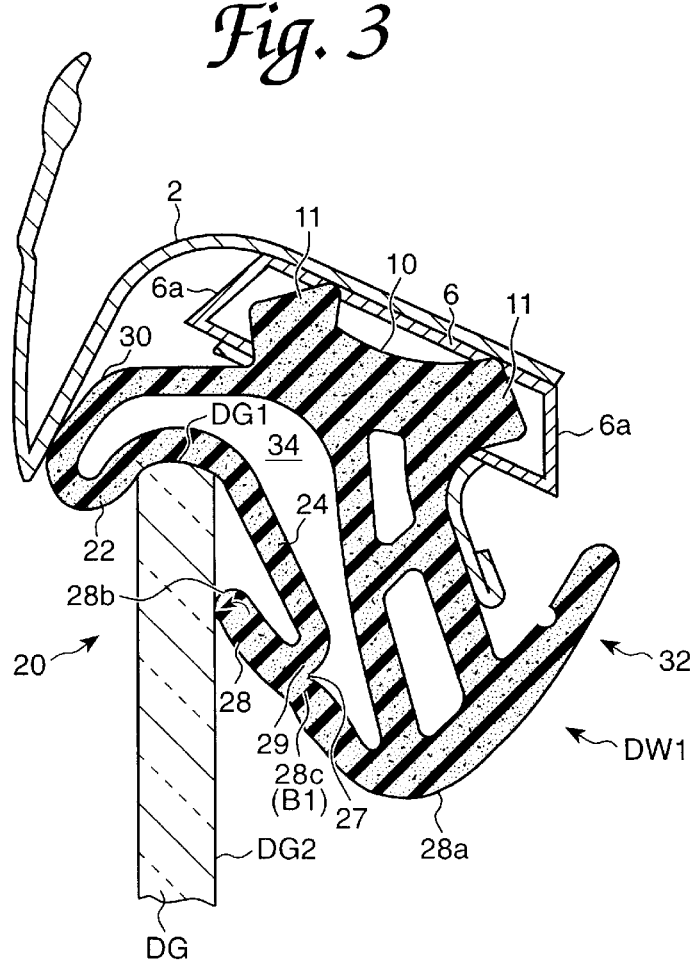
FIG. 3 is a cross sectional view of the door weather strip similar to FIG. 2 but with the door glass fully closed.

As the door glass DG is closed, each component of the door weather strip DW1 changes its shape to that shown in FIG. 3.

As the door glass DG ascends toward the fully closed position its distal end first abuts against the lip 28, which is projected upward with inclination, to elastically deform the lip 28. Further movement of the door glass DG causes the distal end 28b of the lip to abut against the inside surface DG2 of the door glass, and the circumferential edge DG1 of the door glass will abut the first sealing wall 22.

The laterally extending hollow portion 34 is formed behind the first sealing wall 22. As the circumferential edge DG1 of the door glass continues to move upwardly the first sealing wall 22 is bent, and the hollow portion 34 is deformed to surround the circumferential edge DG1. When the first sealing wall 22 and the hollow portion 34 surround the edge DG1 of the door glass, the tightness of the seal created at the edge DG1 of the door glass is maintained, and the inside of vehicle is insulated from the outside.

In addition, because the first sealing wall 22 is bent and pulled up in the direction to which the door glass DG moves, the second sealing wall 24, as a continuation of the first sealing wall 22, is also pulled upward in the direction in which the door glass DG moves. The thus pulled up second sealing wall 24 is further gradually closed toward the inside surface DG2 of the door glass. This is because, when the edge DG1 of the door glass pushes the first sealing wall 22, the bent connecting portion between the first sealing wall 22 and the second sealing wall 24 is extended while the edge DG1 continuously pushes the same position of the sealing wall 22 without any slip, the extended connecting portion follows the movement of the door glass DG.

At the same time, the outer portion of the bridging section 29 between the lip 28 and the second sealing wall 24 is extended, and the lower portion of lip 28 is compressed. Then, the lip 28 starts to turn back in such a manner that it firmly presses its distal end 28b against the inside surface DG2 of the door glass. When the lower side of lip 28 is compressed, the thin walled section 28c is first bent and the distal end 28b of lip 28 is easily turned counterclockwise as the window is raised since the thin walled section 28c acts as a bending portion B1.

As the result, a distal end 28b of lip 28 tightly abuts the inside surface of the door glass. This assures high tightness even on the inside surface DG2 of the door glass, and firmly supports the door glass DG to prevent it from trembling. This degree of close contact becomes even higher as the glass edge DG1 pushes up the first sealing wall 22.

When the door is closed, lip 28 can easily flex around the bending portion B1 which acts as a fulcrum under the pressing force from the door. There is no column portion preventing such flexure. Accordingly, it is possible to avoid a situation where the door is not completely closed due to the repulsion force from the lip 28. Thus, the door can be positively closed with an ordinary closing operation so as to be able to avoid degradation of handling conveniency of the door.

In addition, if, in washing a motor vehicle with water under high pressure, the water under high pressure flows upwardly along the outer surface of the door glass DG, the first sealing wall 22 is pressed upwardly by the water under high pressure. Then, the second sealing wall 24 is also pulled up and the distal end 28b of the lip is more strongly pressed against the inside surface DG2 of the door glass. Thus, even if the water under pressure moves the first sealing wall 22 and penetrates beyond the seal about the window edge lip 28 prevents water leaks into the motor vehicle. That is, the recessed portion at the base of the lip 28 serves as a trough to expel the water outside. Accordingly, even if the motor vehicle washing with water under high pressure is conducted, it is possible to surely prevent penetration of the water into the motor vehicle.

Embodiment 2

The construction of a door weather strip DW2 according to the second embodiment is described with reference to FIGS. 4 and 5.

The door weather strip, generally indicated at DW2, is mounted on a center pillar 3 in the second embodiment and has substantially the same construction as in the door weather strip DW1 according to the first embodiment. Similar reference numerals as used in the description of the first embodiment are used for the same and substantially same components in this second embodiment, the description for which is omitted.

Figure 4:
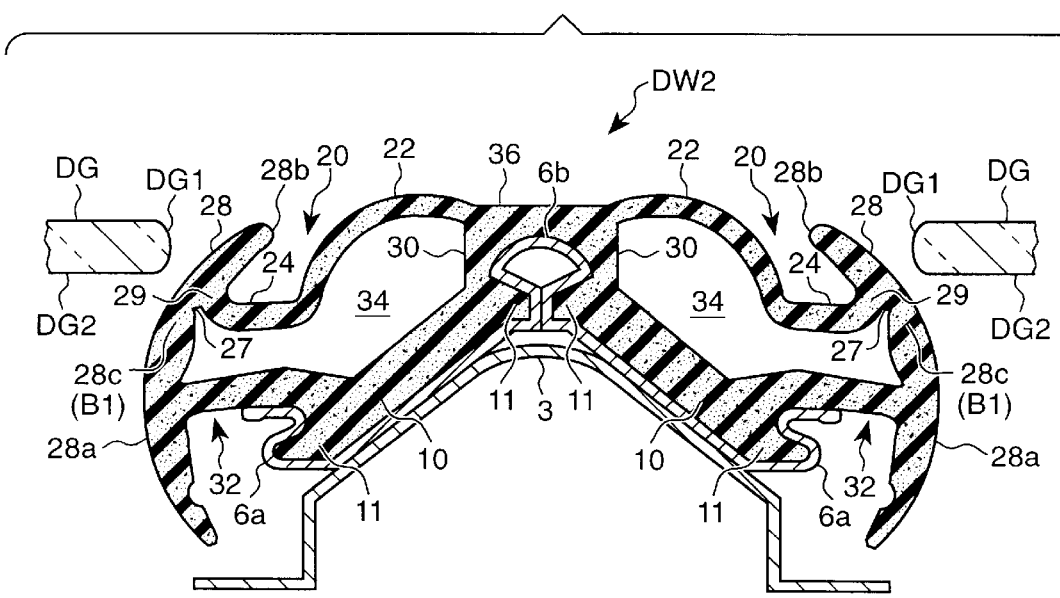
FIG. 4 is a cross sectional view of the door weather strip according to a second embodiment taken along line B—B in FIG. 1 with the door glass opened.
Figure 5:
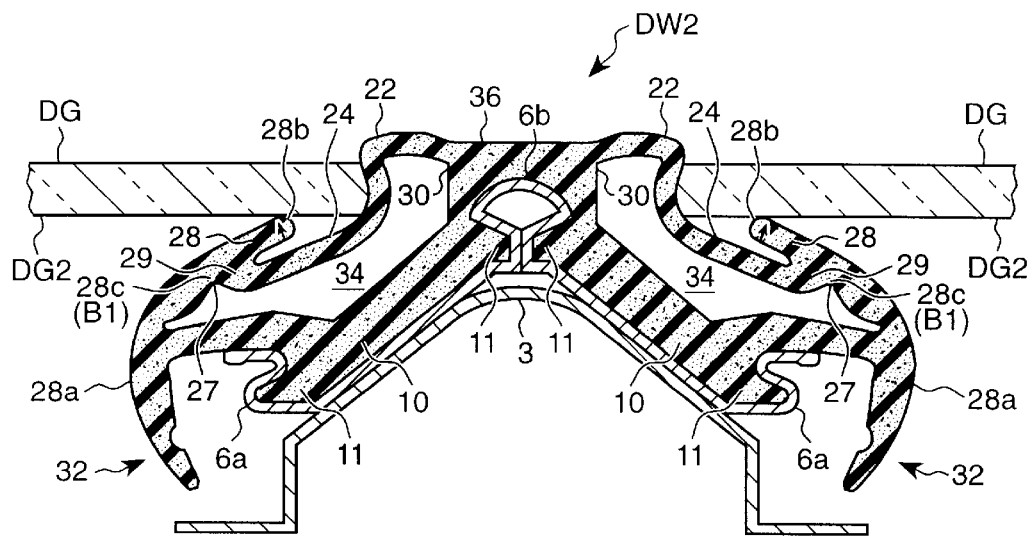
FIG. 5 is a cross sectional view of the door weather strip similar to FIG. 4 but with the door glass fully closed.

As shown in FIG. 4, the door weather strip DW2 is constructed with a pair of front and rear portions, or a pair of right and left portions, respectively, and is mounted on the center pillar 3 through a retainer which is also constructed in a pair of front and rear portions.

Each door weather strip DW2 comprises a mounting base 10 for mounting the door weather strip DW2 on the vehicle, a sealing section 20 including a first sealing wall 22, a second sealing wall 24, and a lip 28, and sealing the door glass DG, an outer side wall 30, and an inner side wall 32. Additionally, a hollow portion 34 is surrounded and defined by the sealing section 20, the outer side wall 30, and the inner side wall 32. The front and rear portions of door weather strip DW2 are connected together by a bridging section 36.

A projection 6b is formed at the center of a retainer 6 provided on the center pillar 3, and serves as one of flanges 6a.

Features of respective components are described based on the door weather strip DW2 shown in FIGS. 4 and 5 in the following.

The outer side wall 30 is extended from the outside of the vehicle of the mounting base 10 to generally reach the side surface of the door, and integrally formed with the bridging section 36 to surround the projection 6b. The first sealing wall 22 is connected at one end to an end of the outer side wall 30, and extends from the connected portion 36 to form a circle bulging toward the outside of the vehicle. The second sealing wall 24 is connected at one end to the other end of the first sealing wall 22, and extends from the connected portion in a generally lateral direction in FIG. 5 to be generally parallel to the inside surface DW2 of the door glass when the door glass DG is fully closed. The other end of the second sealing wall 24 is connected to the lip 28 at its center through the bridging section 29.

The proximal end portion 28a of the lip 28 is connected to the left end of the inner side wall 32, and its distal end 28b is projected with inclination, that is, toward the first sealing wall 22.

The inner side wall 32 is connected at one end to the proximal end portion 28a of the lip, and forms an inclined projection similar to the lip 28, while the other end of the side wall 32 is connected to the proximal end portion, positioned inside the vehicle with respect to the outer side wall 30, of the mounting base 10.

Next, the operation and advantages are described for the door weather strip DW2 with the above construction according to the second embodiment, with emphasis mainly on the differences from the first embodiment.

The second embodiment slightly differs from the first embodiment, in which the door weather strip DW1 is mounted on the roof side, for the change of shape of each component because the door weather strip DW2 is mounted on the center pillar 3. That is, when the door weather strip is mounted on the roof side 2, the first sealing wall 22 is pressed only against the circumferential edge of the door glass, and bent only in the moving direction of the door glass DG. While the inner side surface DG2 of the door glass slides relative to the lip 28, the sliding direction is limited only to the moving direction of the door glass DG.

However, when the door weather strip is mounted on the center pillar 3, the door glass DG moves in a vertical direction perpendicular to the surface of the glass and also moves in the direction toward the first sealing wall 22, that is toward the center of the figure, when the door is closed. Thus, the first sealing wall 22 is caused to abut against the end at the side of door glass DG, is deformed due to the vertical sliding of the door glass DG, and receives pressing force in the lateral direction as shown in FIG. 5. Accordingly, when the door glass DG is fully closed, the first sealing wall 22 is in a state where it is pulled upwardly when mounted on the vehicle. In addition, the lip 28 is also forced to similarly deform. Accordingly, when the door glass DG is fully closed, the lip 28 is deformed to a state where it is under stress in the pulling-up direction.

Even in such state, because the lip 28 includes a thin wall section 28c, which acts as a bending portion B1, lip 28 tends to turn back to strongly press the distal end 28b against the inside surface DG2 of the door glass. Accordingly, high tightness is assured on the inner side surface DG2 of the door glass, and the door glass DG is positively supported so that trembling of the door glass DG, caused during running of the vehicle, can be prevented.

Embodiment 3

The construction of a door weather strip, general indicated at DW3, according to a third embodiment is described with reference to FIGS. 6 and 7.

The third embodiment mounts the door weather strip DW3 on the roof side 2, and has the same basic construction as the door weather strip DW1 according to the first embodiment. Therefore, the differences therefrom will be mainly described. Similar reference numerals used in the description of the first embodiment are again used for the same and substantially same components, the description for which is omitted.

Figure 6:
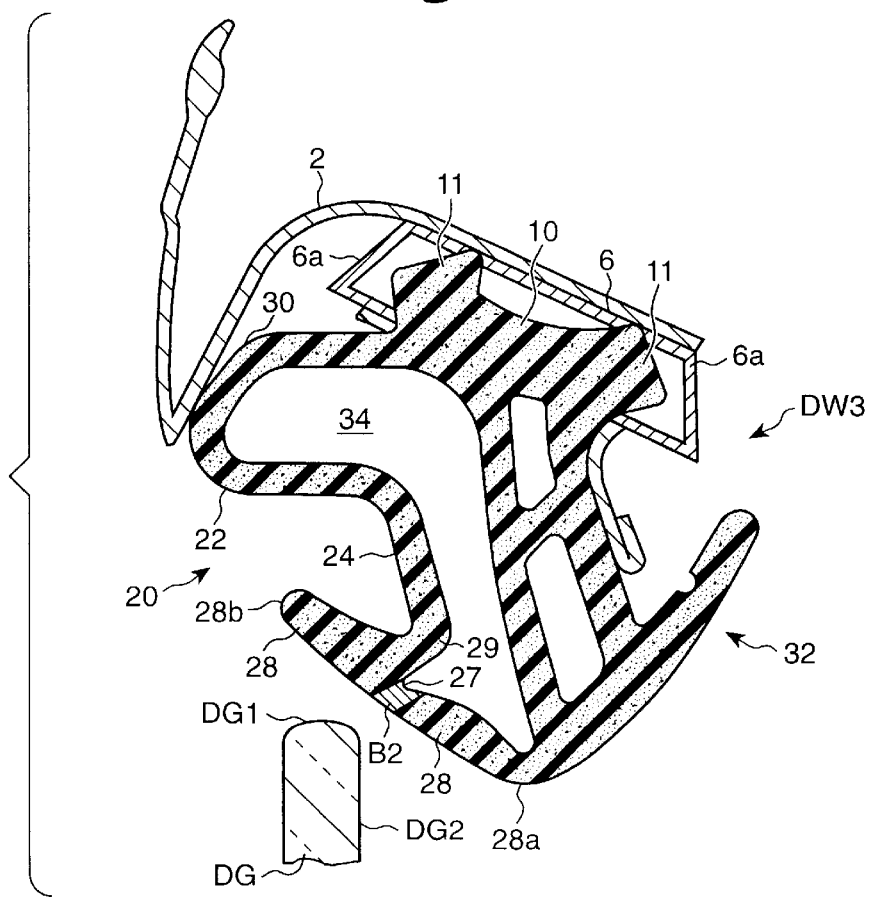
FIG. 6 is a cross sectional view of the door weather strip according to a third embodiment also taken along line at A—A in FIG. 1 with the door glass opened.
Figure 7:
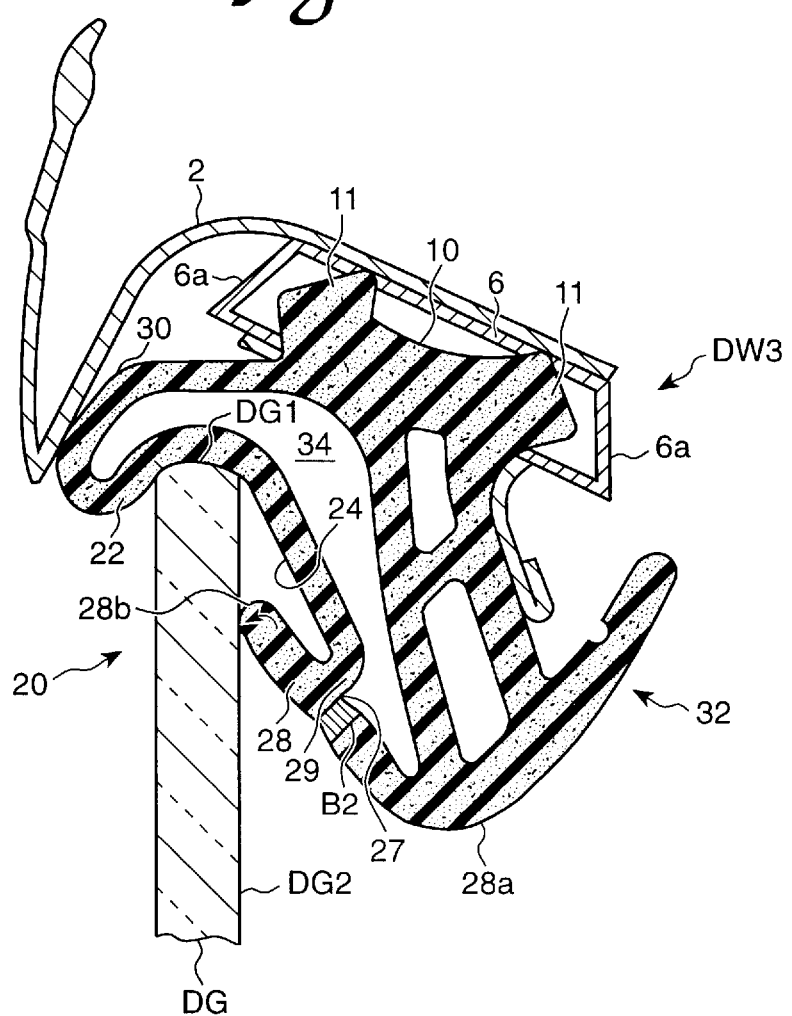
FIG. 7 is a cross sectional view of the door weather strip similar to FIG. 6 but with the door glass fully closed.

As shown in FIG. 6, in the embodiment, a lip 28 of the weather strip DW3 has a bending portion B2 which is present below a connecting portion 29 and which is made of EPDM having a higher foaming ratio than another EPDM from which the body of sealing section 20 is made. In addition, a recess 27, similar to that of the first embodiment, is formed in the bending portion B2. Thus, it is more easily bent than other portions. The manufacturing process for integrally molding the weather strip by changing composition for a portion from that for other portions includes, for example, an extrusion molding process.

Next, the operation and advantages are described for the door weather strip DW3 with the above construction according to the third embodiment mainly on differences from the first embodiment.

As the door glass DG is being moved, the circumferential edge DG1 of the door glass moves while bending a first sealing wall 22 to deform the hollow portion 34 so that it surrounds the circumferential edge DG1. Because the first sealing wall 22 is deformed and pulled up in the moving direction of the door glass DG, a second sealing wall 24, continuing from the first sealing wall 22, is also pulled up in the moving direction of the door glass DG. The thus pulled-up second sealing wall 24 is further gradually closed to the inside surface DG2 of the door glass. At the same time, the outer side of the bridging section 29 between the lip 28 and the second sealing wall 24 is extended, while the lower side of the lip 28 is compressed. Then, the lip 28 starts to turn back in such a manner that it firmly presses its distal end 28b, which abuts against the inside surface DG2 of the door glass, to the inner side surface DG2 of the door glass. This is because the bridging section 29, between the second sealing wall 24 and the lip 28, is formed with a recess 27, and provided with the bending portion B2 made of EPDM with the foaming ratio higher than other EPDM from which the body of the sealing section 20 is made, and because the rigidity of the bending portion B2 is low.

Then, when the lip 28 starts to turn back, the distal end 28a is strongly pressed against the inside surface DG2 of the door glass. Thus, similar to the first embodiment, high tightness can be assured even on the inside surface DG2 of the door glass, and the door glass DG can be firmly supported.

Furthermore, also in the embodiment, when the door is closed, the lip 28 can easily flexed around the bending portion B2 as a fulcrum under the pressing force from the door. There is no column portion preventing such flexure. Accordingly, it is again possible to avoid a situation where the door is not completely closed by reason of a repulsion force from the lip 28. Thus, it is possible to avoid degradation of handling conveniency of the door.

Embodiment 4

The construction of a door weather strip, generally indicated at DW4, according to a fourth embodiment is described with reference to FIG. 8.

The fourth embodiment also mounts the door weather strip DW4 on the side 2 of a vehicle roof, and has the same basic construction as the door weather strip DW1 according to the first embodiment. Therefore, again the differences therefrom are mainly described. Similar references to those used in the description of the first embodiment are used for the same and substantially same components, the description for which is omitted.

Figure 8:
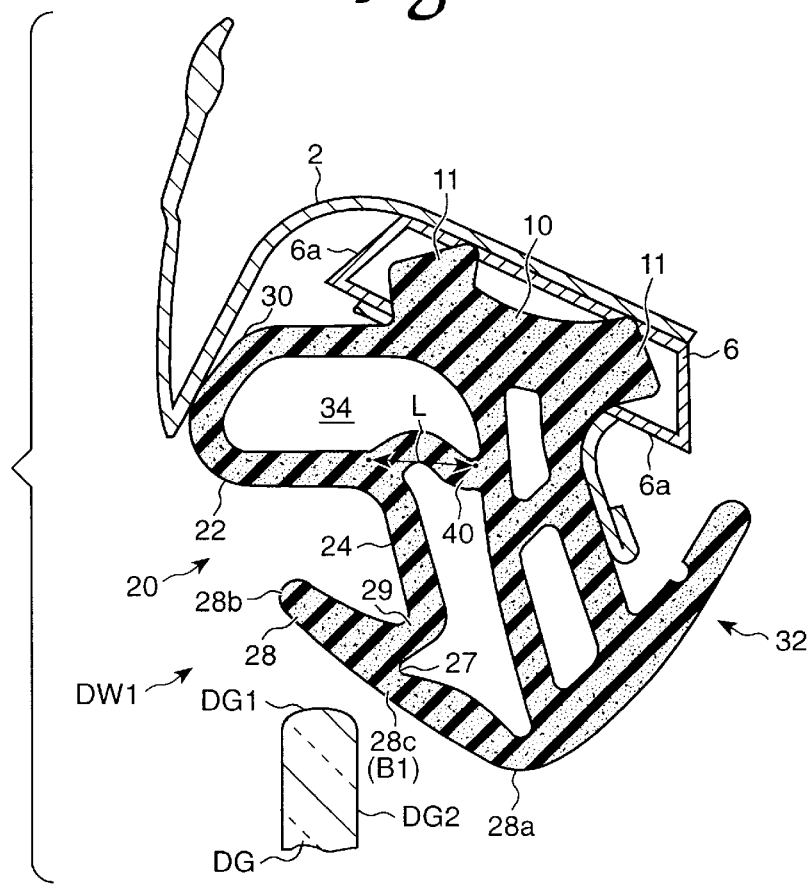
FIG. 8 is a cross sectional view of the door weather strip according to a fourth embodiment taken along line A—A in FIG. 1 with the door glass opened.
Figure 9:
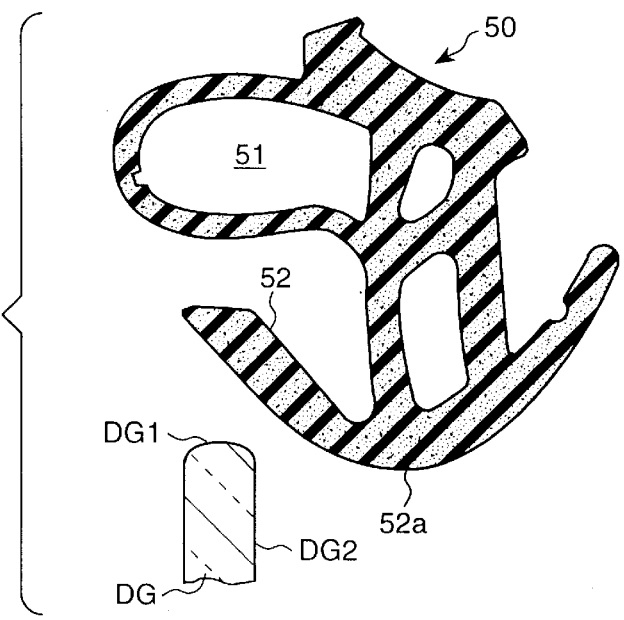
FIG. 9 is a cross sectional view of the door weather strip according to the second conventional example with the door glass opened.
Figure 10:
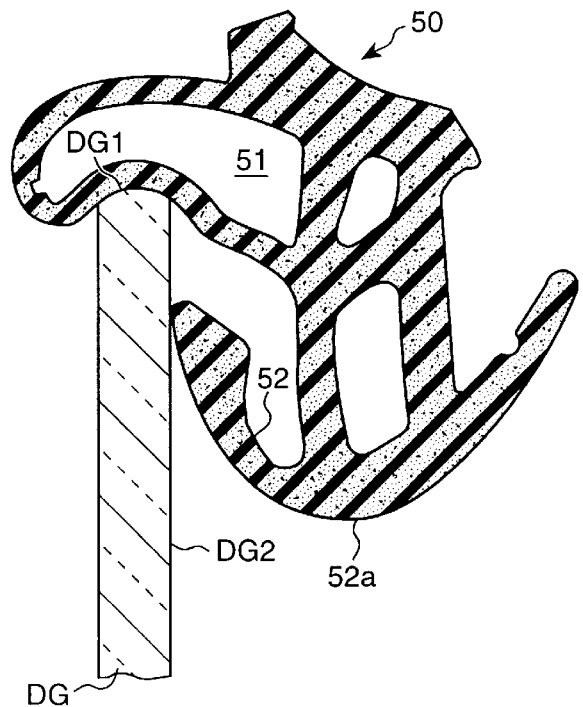
FIG. 10 is a cross sectional view of the door weather strip according to the second conventional example with the door glass fully closed.

As shown in FIG. 8, the door weather strip DW4 of the embodiment significantly differs from those described for the first and third embodiments in that in the hollow portion 34 includes a reinforcement 40 connecting the approximately middle portion between the first sealing wall 22 and the second sealing wall 24 to the vehicle inner side wall 32. The reinforcement 40 is made of EPDM as in the other portions. Additionally, the reinforcement 40 is formed with a length longer than the distance L connecting the approximately middle portion between the first sealing wall 22 and the second sealing wall 24 to the inner side wall 32. More particularly, the reinforcement 40 is formed to project in the closing direction of the door glass DG.

Next, the operation and advantages are described for the door weather strip DW4 with the above construction according to the fourth embodiment mainly on differences from the first embodiment.

According to the embodiment, in addition to the features and advantages described for the first embodiment, the hollow portion 34 includes a reinforcement 40 connecting the approximately middle portion between the first sealing wall 22 and the second sealing wall 24 to the inner side wall 32. Thus, even if the first sealing wall 22 and the second sealing wall 24 are repeatedly deformed under stress from the door glass DG, they are supported by the reinforcement 40 so that they are reinforced. Accordingly, the first sealing wall 22 and the second sealing wall 24 hardly fatigue so that their shapes can be maintained for a long period of time.

Additionally, the reinforcement 40 is formed in a length longer than the distance L connecting both portions, and has flexibility. Thus, it can easily flexed when the door is closed. Accordingly, even if the reinforcement 40 is provided as in the embodiment, it is possible to avoid repulsion forces too high to prevent the door from being easily closed.

Furthermore, the reinforcement 40 is formed to project in the closing direction of the door glass DG. Thus, when the door glass DG is closed, the second sealing wall 24 can easily follow it upwardly.

The present invention is not limited to the embodiments described above, but may be constructed as follows:

(1) While, in the above embodiments, the bending portions B1 and B2 are formed by thinning the wall thickness and by molding from a different material, respectively, the shape may be appropriately modified by taking the turning-back frequency of the lip 28 into consideration. When a recess is provided it can provide high bending effect even if the extent of the recess is limited, and, if a thin wall area is partially formed, can enhance the durability of the thin wall area. In addition, the recess 27, in the above embodiments, may be provided outside the hollow portion 34.

(2) The recess 27 may not be formed in the bending portion B2 of the third embodiment. Even if such arrangement is employed, the bending portion B2 can easily flex, and advantageously it is unnecessary to consider how such recess should be designed.

(3) While the reinforcement 40 in the fourth embodiment is formed to project in the closing direction of the door glass DG, it may be formed to project in the opposite direction.

In addition, while, in the fourth embodiment, the reinforcement 40 is arranged to connect the approximately middle portion between the first sealing wall 22 and the second sealing wall 24 to the inner side wall 32, it may be arranged to connect the middle portion to the mounting base 10.

(4) While the above embodiments are described for cases where the door weather strip is mounted on the roof side 2 or the center pillar 3, there is no difference in advantages in a case where it is mounted on the front pillar or the rear pillar.

As will be apparent from the above, the automobile weather strip according to the invention attains significant advantages that it can enhance the tightness performance on the door glass, the weather strip will positively and firmly support the door glass, and prevent the door from being difficult to be closed. Therefore, it can surely prevent penetration of water into the vehicle even when the motor vehicle is washed with water under high pressure.

Moreover, the automobile weather strip according to the invention can attain a further significant advantage by preventing fatigue of the first and second sealing walls so that their shapes are maintained for a long period of time.

What is claimed is:

1. An automobile weather strip adapted for use on a peripheral portion of a door opening of a vehicle body and cooperable with a door glass of the automobile, said weather strip comprising:
    a mounting base for mounting said weather strip on said peripheral portion of said door opening of the vehicle body;
    an outer side wall extending from one side of said mounting base to a position exterior to an outer surface of the door glass;
    an inner side wall extending from an opposite side of said mounting base interiorly to an inner surface of the door glass; and
    a sealing section including:
        a first sealing wall extending from an outer end of said outer side wall in a direction toward a position interior to the inner surface of the door glass,
        a second sealing wall extending from an end of said first sealing wall opposite to said outer side wall interiorly to the inner surface of the door glass, said second sealing wall merging with said first sealing wall at a connecting section, said first sealing wall and said second sealing wall being arranged in a generally non-co-linear orientation with respect to each other when said weather strip is not engaged by the door glass,
        a bridging section extending from one end of said second sealing wall opposite to said first sealing wall, and
        a lip connected at a generally middle portion thereof to an end of said bridging section opposite to said second sealing wall at a position interior to the inner surface of the door glass, said lip having an end connected to an end of said inner side wall opposite to said mounting base, a distal end extending toward said first sealing wall in a direction toward a position exterior to the outer surface of the door glass, and an inflection portion constructed and arranged to have a rigidity lower than remaining portions of said sealing section, said inflection portion being located adjacent to a position at which said lip is connected to said bridging section and between the position at which said lip is connected to said bridging section and the end of said lip connected to said inner side wall,
    said sealing section, said outer side wall, said inner side wall, and said mounting base defining at least one hollow section therebetween,
    wherein said inflection portion causes said second sealing wall and the end of said lip connected to the end of the inner side wall to assume a generally co-linear relationship extending from a peripheral edge of the closed door glass to the end of the inner side wall opposite to said mounting base.

2. An automobile weather strip according to claim 1, wherein said inflection portion is formed from a material having a lower rigidity than that used for forming the remaining portions of said sealing section.

3. An automobile weather strip according to claim 1, wherein said inflection portion is formed to have a wall thickness thinner than that of the residual portion of said lip.

4. An automobile weather strip according to claim 1, wherein said inflection portion is formed by providing a recess in at least one part thereof.

5. An automobile weather strip according to claim 1, wherein a flexible reinforcement is provided in said at least one hollow section, said flexible reinforcement connecting an approximately middle portion between said first sealing wall and said second sealing wall and a one of said inner side wall and said mounting base, and being formed in a bent length.

6. An automobile weather strip according to claim 1, wherein said strip is made of foamed rubber.

7. An automobile weather strip according to claim 3 wherein said wall thickness of said inflection portion is made smaller than that of said bridging section by forming a recess in said lip adjacent said bridging portion and facing inwardly to said hollow section.

* * * * *